United States Patent [19]

Nama

[11] Patent Number: 4,991,008
[45] Date of Patent: Feb. 5, 1991

[54] AUTOMATIC TRANSACTION SURVEILLANCE SYSTEM

[75] Inventor: Donald Nama, San Juan Capistrano, Calif.

[73] Assignee: Intec Video Systems, Inc., Laguna Hills, Calif.

[21] Appl. No.: 278,359

[22] Filed: Dec. 1, 1988

[51] Int. Cl.$^5$ .............................................. H04N 7/18
[52] U.S. Cl. ...................................... 358/108; 358/93; 235/379
[58] Field of Search ....................... 358/108, 93; 902/8, 902/35, 5; 109/2, 5, 11; 235/379; 364/405, 408

[56] References Cited

U.S. PATENT DOCUMENTS

| | | | |
|---|---|---|---|
| 2,914,746 | 11/1959 | James | 358/108 |
| 4,145,715 | 3/1979 | Clever | 358/108 |
| 4,326,218 | 4/1982 | Coutta et al. | 358/108 |
| 4,337,482 | 6/1982 | Coutta | 358/108 |
| 4,524,268 | 6/1985 | Fukatsu | 902/12 |
| 4,679,154 | 7/1987 | Blanford | 364/405 |
| 4,700,223 | 10/1987 | Shoataro et al. | 358/108 |
| 4,821,118 | 4/1989 | Lafreniere | 358/108 |

*Primary Examiner*—John K. Peng

[57] ABSTRACT

The invention is directed to an automatic financial transaction surveillance system wherein an apparatus generates a video image signal that represents a financial transaction of a situation involving a financial transaction at an automatic teller machine or at a retail point-of-sale situation. A data entry mechanism is employed to generate an alphanumeric transaction information data signal that represents the nature of the transaction. A video camera arrangement generates a video image signal that represents a transaction of an actual situation in which the financial transaction is taking place. A transaction information module is responsively electrically coupled to the video image signal generating camera arrangement and to the data entry mechanism that generates the alphanumeric transaction information data signal. The transaction information module is responsive to the video image signal and the transaction information data signal to thereby provide a combined video image and transaction information output signal that may be utilized to generate a video image for subsequent study of the nature and content of the financial transaction.

4 Claims, 8 Drawing Sheets

FIG. 9.
TRUTH TABLE

| INPUTS | | | | | | | OUTPUTS | | | | | | | | | | | | | | | |
|---|---|---|---|---|---|---|---|---|---|---|---|---|---|---|---|---|---|---|---|---|---|---|
| $\overline{E0}$ | $\overline{E1}$ | A3 | A2 | A1 | A0 | | 0 | 1 | 2 | 3 | 4 | 5 | 6 | 7 | 8 | 9 | 10 | 11 | 12 | 13 | 14 | 15 |
| L | H | X | X | X | X | | H | H | H | H | H | H | H | H | H | H | H | H | H | H | H | H |
| H | L | X | X | X | X | | H | H | H | H | H | H | H | H | H | H | H | H | H | H | H | H |
| H | H | X | X | X | X | | H | H | H | H | H | H | H | H | H | H | H | H | H | H | H | H |
| H | L | L | L | L | L | | L | H | H | H | H | H | H | H | H | H | H | H | H | H | H | H |
| H | L | L | L | L | H | | H | L | H | H | H | H | H | H | H | H | H | H | H | H | H | H |
| H | L | L | L | H | L | | H | H | L | H | H | H | H | H | H | H | H | H | H | H | H | H |
| H | L | L | L | H | H | | H | H | H | L | H | H | H | H | H | H | H | H | H | H | H | H |
| H | L | L | H | L | L | | H | H | H | H | L | H | H | H | H | H | H | H | H | H | H | H |
| H | L | L | H | L | H | | H | H | H | H | H | L | H | H | H | H | H | H | H | H | H | H |
| H | L | L | H | H | L | | H | H | H | H | H | H | L | H | H | H | H | H | H | H | H | H |
| H | L | L | H | H | H | | H | H | H | H | H | H | H | L | H | H | H | H | H | H | H | H |
| H | L | H | L | L | L | | H | H | H | H | H | H | H | H | L | H | H | H | H | H | H | H |
| H | L | H | L | L | H | | H | H | H | H | H | H | H | H | H | L | H | H | H | H | H | H |
| H | L | H | L | H | L | | H | H | H | H | H | H | H | H | H | H | L | H | H | H | H | H |
| H | L | H | L | H | H | | H | H | H | H | H | H | H | H | H | H | H | L | H | H | H | H |
| H | L | H | H | L | L | | H | H | H | H | H | H | H | H | H | H | H | H | L | H | H | H |
| H | L | H | H | L | H | | H | H | H | H | H | H | H | H | H | H | H | H | H | L | H | H |
| H | L | H | H | H | L | | H | H | H | H | H | H | H | H | H | H | H | H | H | H | L | H |
| H | L | H | H | H | H | | H | H | H | H | H | H | H | H | H | H | H | H | H | H | H | L |

Outputs 0–7: READ; Outputs 8–15: WRITE

H = HIGH VOLTAGE LEVEL
L = LOW VOLTAGE LEVEL
X = DON'T CARE

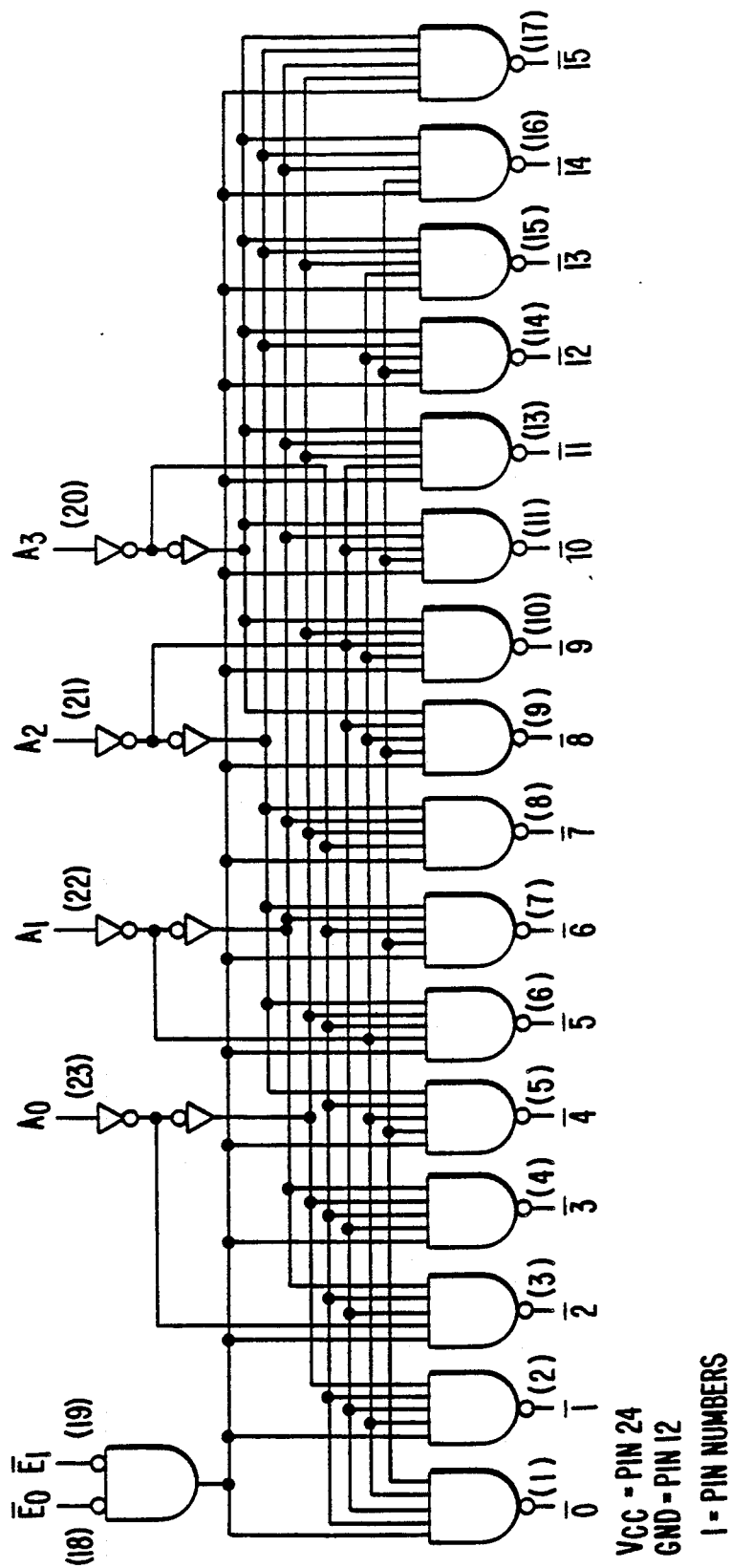
FIG. 10. LOGIC DIAGRAM

AUTOMATIC TRANSACTION SURVEILLANCE SYSTEM

Technical Field

This invention relates to automatic surveillance of business transactions.

Background Art

The recent past has witnessed the proliferation of automatic teller machines in record numbers The rate of increase seems to be without end as banking and credit card institutions seek the placement of such machines at every remote location where their appears to be sufficient foot or mobile traffic to support their use. These machines are typically unguarded repositories of substantial sums of cash the presence of which cash attracts not only the public that use the service, but those who's motives are less than honorable The institutions that control these automatic teller machines most typically provide each of their customers a magnetically encoded plastic card and a personal identification number (PIN) Bank or credit card theft is commonplace today. The only security available to prevent others to from using the cards to withdraw the cash of the true owner of the card resides in the secrecy of the PIN. Even when the institutions warn the card holder not to write-their PIN number anywhere on anything in the card holders wallet or purse, the card holders do otherwise or alternatively select a PIN which employs a number representative of the day and month of their birthday, or the numbers taken from their social security number, telephone, address, etc. All of these numbers are most generally on items in the wallet or purse of the individual that has been stolen along with the bank card. It is only then a matter of systematic entering of all available combinations of these numbers to find one that allows access to the funds of the card holder.

The most common unauthorized use of a bank card arises when a member of the cardholders household learns of the PIN, appropriates the card and withdraws funds or makes purchases at a retail store with ATM capability, all without the knowledge of the cardholder. The cardholder then asserts that the bank has made an improper withdrawal from the cardholder's account. The cardholder usually provides the bank with evidence that proves it was not possible for him to have had access to an ATM on day of the withdrawal. The bank is then left with the burden of proving that the withdrawal was not computer error. The invention to be described hereinafter completely solves this identification problem Other sophisticated schemes have evolved to withdraw the funds of card holders from ATM's. The details of these schemes are most generally not reported in any detail in the press lest dishonest parties learn how to do the same and further exacerbate the problem.

Given the vulnerability of ATM'S as described above, it is not surprising that inventors have frequently addressed ATM'S security and financial transaction verification in the past.

Amongst the earliest efforts in providing transaction security and verification of a transaction with an automatic machine will be found in the Simjian U.S. Pat. No. 2,927,525 ('515) where the inventor was concerned with a vending machine in which there was a concern that there be a record in the form of an image of an article dispensed or an image of the article dispensed and that of an object inserted in the vending machine and/or a record of the depositor. The invention of the '515 patent contemplated that the image recording means may be in the nature of a photographic camera and associated emulsion type film or electronic scanning and magnetic tape storing. The '515 patent does not suggest the idea of providing a real time record of the individual and all related numeric details of a complex transaction The inventor Simjian in his U.S. Pat. No. 3,079,603 ('603) also addressed the need for recording an image of sequentially deposited articles deposited in a depository machine along with the validation of a depositor prepared receipt The '603 invention critically depends upon the clarity of the data entered upon the receipt in order to corroborate or validate at a later time the numeric details of the transaction. The invention to be described hereinafter completely avoids the inherent readability problem of a document, i.e., a receipt involved in a transaction with the machine.

Further efforts by Simjian to provide a recording system for depository machines is to be found in his U.S. Pat. No. 3,148,932 ('932) where he teaches the idea of providing documentary evidence of a deposit at a remote location by means of a television camera tube which is connected by cable to a television receiver where a microfilm camera is employed to take a picture of an image on the television receiver screen. The Simjian '932 patent is not unlike the other Simjian patents '515 and 603 in that the utility of the system is constrained by the readability or legibility of the transaction data recorded. The instant invention to be described hereinafter completely avoids the problem of readability of the details of the transaction The need for surveillance of a business transaction may arise whenever an individual is given the task of entering data into an electronic device. One such occasion arises in point-of-sale retail transactions where a individual in the employ of a business is given the job of entering the price and quantity of a product into an electronic cash register for the purpose of generating a receipt that will provide a total of items being purchased by a customer. The owner of a retail business assumes that the individual, i.e., clerk, that enters the price and product quantity data will unfailingly enter the correct price and product quantity in every transaction. Unfortunately such is not the case where the clerk is dishonest. Clerks who have dishonest motives frequently have similarly motivated associates who bring products to be purchased through a check out line they are handling and then fail to enter the correct price and quantity of the goods being purchased, thereby reducing their associates total bill and robbing their employer of the difference in price between what should have been charged and that which was actually entered into the electronic cash register The use of bar coded products and laser scanning devices to read the coded products has helped reduce this type of theft There are however many products offered for sale within a retail business on which there is no bar code to be read automatically and the entry of false price and quantity transaction data is possible.

Accordingly, the need for surveillance of point-of-sale retail transactions has long been recognized and addressed by the prior art. Just such an example is to be found in the Simonson et al. U.S. Pat. No. 3,709,121 ('121) where the patent teaches the idea of providing photographic surveillance of cash register operations The '121 patent is directed to a surveillance system where a motion picture camera is situated at a distance from a cash register sufficiently great so as to prevent individuals in the vicinity of the cash register from being distracted by the camera. The motion picture camera can be operated in a single-frame mode so that the items themselves being purchased are photographed along with the dollar amount that the numerals reflect in an item price/total display window The surveillance approach taken by the '121 patent suffers from the same deficiency that the vending machine and ATM's heretofore described, namely, lack of transaction data readability. The '121 patent shows the movie cameras positioned remote from cash registers being monitored. At the distances depicted in the '121 patent, the numerals would be only bearly discernately with the naked eye because the numeral in the display windows are intended to be viewed at a distance of a few feet. There is little question that with sufficient enlargement and/or the use of a magnifying glass, the management of the retail business could, given enough time monitor each of the transactions. The invention to be described hereinafter completely obviates this type of monitoring problem by providing on a magnetic video film not only an image of the parties to every retail transaction but in large readable print superimposed on the film the exact nature of each transaction.

DISCLOSURE OF INVENTION

The invention more specifically relates to an automatic transaction surveillance system which includes a camera positioned to receive an image of an individual(s) involved in a financial transaction with an electronic storage device, such as an automatic teller machine (ATM) or an electronic cash register. The camera provides a signal representative of the image The electronic storage device is of the type that includes a transaction data entry keypad which provides a transaction data signal which may be employed to activate an alphanumeric display.

The storage device includes a transaction information module that receives both the camera image signal and the transaction data signal The transaction information module provides a combined camera image and transaction data signal A recording device is electrically coupled to receive and record from the transaction information module the combined camera image and transaction data signal for later visual monitoring of a composite picture that includes both the camera image and an alphanumeric representation of the transaction data signal It is therefore a primary object of this invention to provide an automatic transaction surveillance system which provides a permanent viewable image of the individual(s) and items involved in a transaction, as well as, an easily readable alphanumeric representation of the nature of the transaction superimposed on the viewable image.

Another object of the invention is to provide an automatic transaction surveillance system that is highly effective in the monitoring of automatic teller machine (ATM) and point-of-sale retail transactions.

Yet another object of the invention is to provide an ATM transaction surveillance system that is cooperatively linked with a remote, main banking facility for the recording of transactions or the visual monitoring of transactions at the ATM.

In the attainment of the foregoing objects, the invention contemplates that the automatic transaction surveillance system will include a video camera positioned to receive an image of an individual(s) in a financial transaction such as a withdrawal at an ATM or the checkout and purchase of goods at a point-of-sale in a retail establishment. The video camera provides a video signal representative of this image.

The electronic storage device whether it be an ATM or electronic cash register includes an alphanumeric data entry keypad which provides an alphanumeric signal representative of the transaction. Where electronic cash registers are involved alphanumeric transaction data may also be generated by automatic bar code label readers which readers decode bar coded labels on the items being purchased In either situation, the alphanumeric signal can be employed to activate an alphanumeric display.

A transaction information module receives both the video camera signal and the alphanumeric transaction signal and provides a combined camera image and transaction data signal to a video tape recorder which provide a easily viewable record that may be monitored at the will of the system user.

In the ATM embodiment of the invention, the invention additionally provides for the reading of magnetically encoded cards which allows the transaction signal to have included therein the identity of the card owner.

In another embodiment of the invention in an ATM, the invention contemplates as being within its purview an arrangement where an alphanumeric transaction signal is first electrically coupled to a remote main banking facility data processing computer which in turn is coupled to a receipt printer and a transaction information module where a video camera image signal is combined to provide a combined siganl that may be delivered directly to a video monitor/recorder at the main bank as well as a video recorder at the ATM.

Other objects and advantages of the present invention will be apparent upon reference to the accompanying description when taken in conjunction with the following drawings.

BRIEF DESCRIPTION OF DRAWINGS

FIG. 9 is a truth table which relates to the decoder of FIG. 8;

FIG. 10 is a logic diagram which relates to the decoder of FIG. 8 and

BEST MODE FOR CARRYING OUT THE INVENTION

Figure 1:
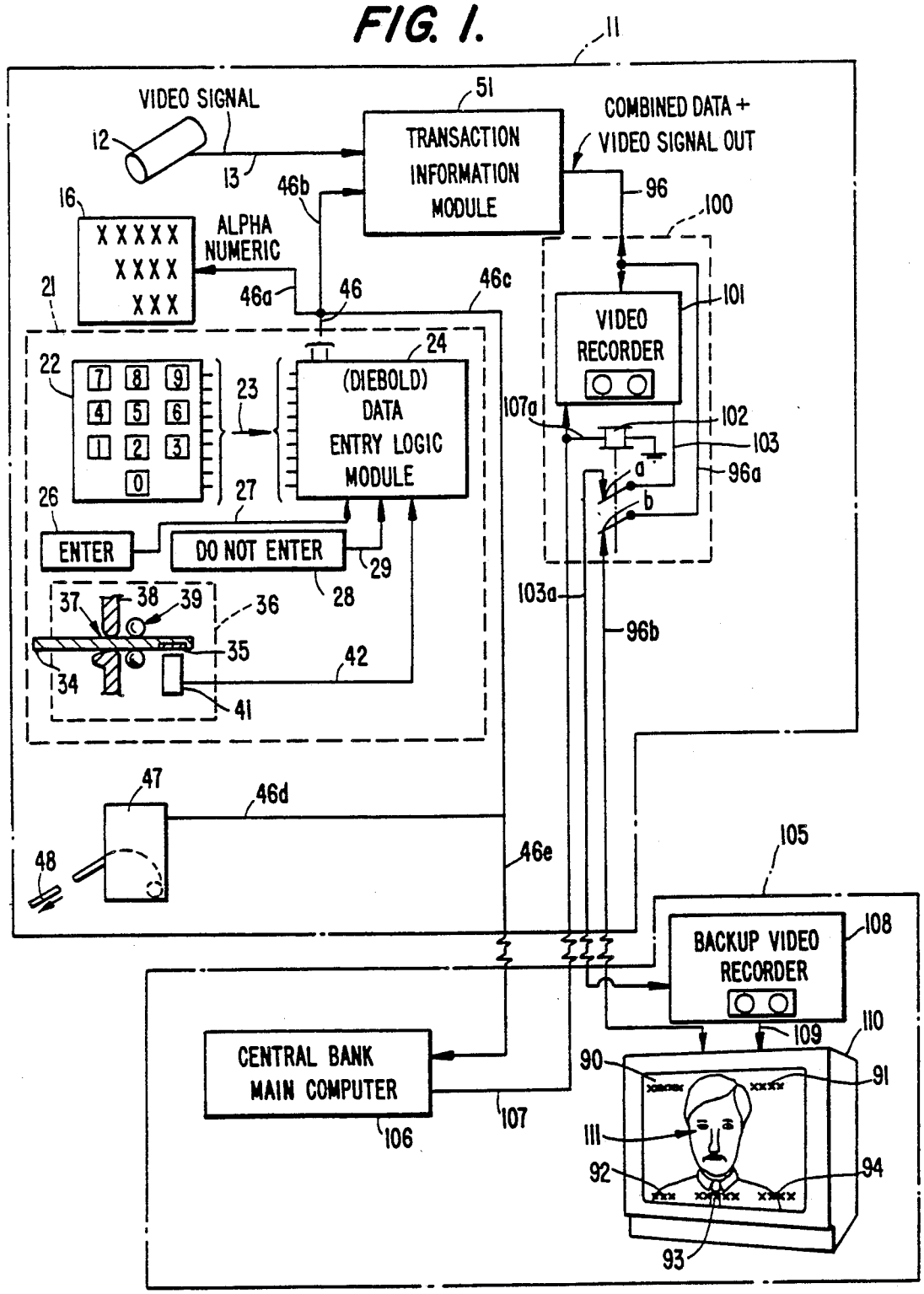
FIG. 1 illustrates in block diagram form the invention embodied in an automatic teller machine environment.

Reference is now made to FIG. 1 in which there is illustrated in block diagram form one embodiment of the invention in which the automatic surveillance system of the invention finds utility when employed in conjunction with an automatic teller machine ATM 11 shown in in outlined form. Not shown in FIG. 1 is an illustration of an individual standing in front of the ATM. It is to be understood that an individual's presence is required to interact with the ATM in order to accomplish a financial transaction. In this regard, it will be noted that FIG. 1 also depicts a remote central bank 105 also shown in outlined fashion. Within the central bank 105 there is shown a graphic representation of a video monitor 110 which has a video image of an individual that is interacting with the ATM. The manner in which this individual's image 111 arrives at the monitor will be described more fully hereinafter. Needless to say, the image 111 is that of the individual referred to above as not being shown.

Those familiar with ATM's will recall that most ATM's include a number of standard features such as a cathode ray tube (CRT) display 16 upon which there is normally an alphanumeric display that provides a greeting to the ATM user and instructions as to the steps necessary to conduct a transaction with the ATM. The greeting usually requests the individual to insert a bank or credit card 34 into a credit card slot 37 which slot is provided through a wall 38 of the ATM. Although not shown there is usually provided a photo cell arrangement that detects the entry of the card 34 and activates a drive roller mechanism 39 to cause the card to be drawn into the ATM. The card 34 is provided with a magnetically coded strip 35 which has encoded there on the identity of the card owner. A magnetic pick up head 41 is positioned as shown to read the magnetically coded strip 35 and provide a signal indicative of the card owners identity on lead 42 to a data entry logic module 24. The card receiving drive and recording arrangement just described will be referred to from time to time hereinafter as a credit card reading means 36 outlined as shown.

Once the card 34 has been inserted and read as described above there will appear on the CRT display a request for the individual involved in the transaction to enter a personal identification number (PIN) by manually manipulating the keys 1, 2, 3, etc. on a data entry keypad 22. If the PIN is accurately shown on the CRT display, the individual is instructed to press an "ENTER" key 26 which enables the data entry logic module 24 via lead 27. The data entry keypad 22 delivers an alphanumeric signal via lead 23 to data entry logic module 24. If the PIN is not accurate then the individual is instructed to manually press a "DO NOT ENTER" key 28 which signals the data entry logic module 24 via lead 29 to clear the CRT display 16 and request the PIN again The data entry keypad 16 and associated "ENTER" and "DO NOT ENTER" keys 26, 28; card reading means 36 and data entry module 24 are all well known arrangements in the prior art and will not be described in further detail. Collectively these just recited data entry elements 22, 24, 26, 28 and 36 will be referred to from time to time hereinafter, collectively as a transaction data entry means 21.

The most significant feature of the transaction data entry means, from the standpoint of the instant invention resides in the fact the data entry logic module 24 delivers an alphanumeric signal on leads 46, 46b to a transaction information module 51; the same signal on lead 46, 46a to the CRT display 16; on leads 46, 46c, 46d to a transaction receipt printer 47 and the same signal on leads 46, 46c, 46e to a central bank 105 main computer 106.

Returning now to the discussion of the generation of an individual's image 111 noted earlier in respect of the video monitor 110, attention is directed to the upper left hand corner of the ATM of FIG. 1 where diagrammatically there is shown a video camera 12. It should readily be appreciated that the video camera 12 is mounted in such a manner in respect to the ATM that the image field of the camera fully encompasses the identifying features of the individual involved in a transaction with the ATM.

The video camera 16 provides a video signal on lead 13 which signal is representative of the image The video image signal is delivered via lead 13 to the transaction information module 51.

The transaction information module (TIM) 51 receives the video image signal lead 13 and alphanumeric transaction data signal on lead 46b. The TIM combines the video image signal and the alphanumeric transaction signal and provides on TIM 51 output lead 96 a combined video camera image and transaction data signal for later visual monitoring in the manner now to be described The details of operation of the TIM 51 and its circuitry will be explained more fully hereinafter in respect of FIGS. 4 to 10.

As just previously noted there is present on lead 96 from TIM 51 combined video camera image and transaction data signal which is shown delivered to a video recorder and control unit 100 shown outlined. A video recorder 101 receives the combined signal for recordation on tape in a wholly conventional manner.

The combined image and transaction data signal may also be delivered, as shown, via leads 96, 96a, the back contact 6 of relay 102 and 96b to the video monitor 110 at the control bank 105

The cathode ray tube of the video monitor 110 has shown on its face in addition to the image 111 of the individual a display of all transaction data that had been entered into the ATM via the data entry means 21.

It should be understood that the illustration shown on the face of video monitor 110 represents only a small measure of the alphanumeric representation of the transaction data that may arise in any transaction because the combined video image and transaction data signal changes continuously in a real time fashion Every detail of the transaction data can be caused to appear in bold clear easy to read characters on the face of the video monitor Where the combined video image and transaction data signal is captured on tape a party involved in a later visual monitoring may readily forward and reverse, as well as, pause the tape to better read the alphanumeric characters on the screen of the video monitor Returning now to the control of the video recorder 101, monitor 110 and a back up video recorder 108, FIG. 1 sets forth one way in which this control may be accomplished.

The video recorder 101 is shown controllingly connected via lead 107 to the central bank main computer 106. In the event it is determined at the central bank that there is a desire to interrupt the normal recording of the combined video image and transaction data signal by video recorder 101, as well as, interrupt the video monitor 110 and provide a back up video recording, there need only be a signal initiated from the main computer 106 on lead 107, 107a thru relay 102 to ground to activate the relay 102 thereby closing front contact a of relay 102 which will complete a circuit from recorder 101 and lead 103 to allow the previously recorded image and transaction data to be delivered from video recorder 101 via lead 103a to back up video recorder 108 to be rerecorded The backup video recorder 108 is electrically coupled to the video monitor 108 via lead 109 to permit the visual review of the recorded combined signal at a later time.

The video recorder control arrangement shown in FIG. 1 is schematic and is intended to show one of many different uses that may be made of the combined video image and transaction data signal It being understood that the various other switching arrangements that could involve solid state devices is contemplated as being within the scope of the invention.

Figure 2:
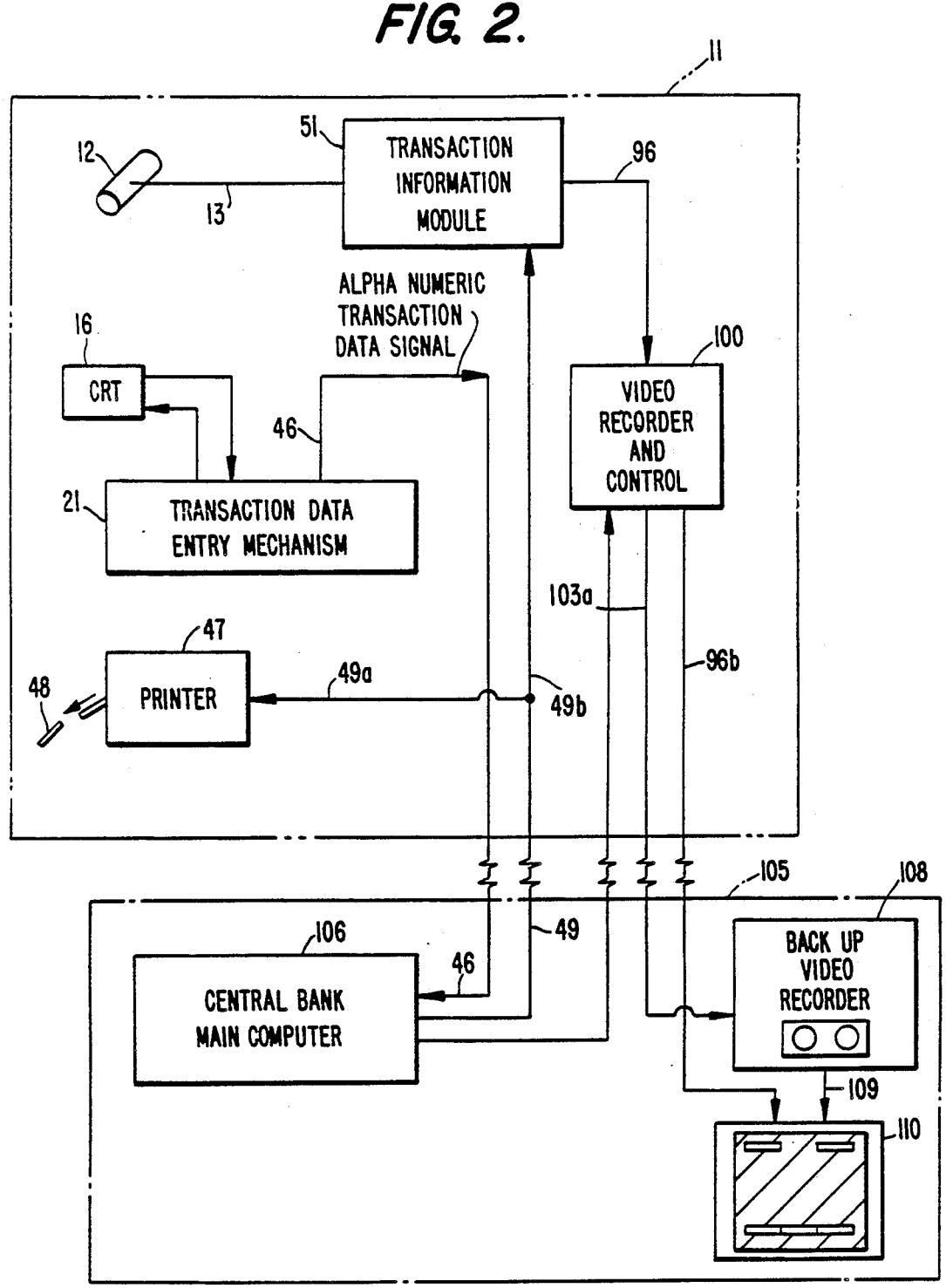
FIG. 2 illustrates in block diagram form another embodiment of the invention in an automatic teller machine environment.

Before the operation of another embodiment of the invention as shown in FIG. 2 is described, attention will again be directed to a manner in which alphanumeric transaction data signal on lead 46 from the data entry logic module 22 of the transaction data entry means 21 is utilized.

When studying FIG. 1, it will be observed that in the ATM arrangement depicted, the alphanumeric transaction data signal is simultaneously delivered to the CRT display 16, the TIM 51, the printer 47 that produces transaction receipt 48 and the central bank main computer 106.

In the banking business there are banks that are much concerned with maintaining secure that portion of the transaction data signal that includes the card owners identification code as well as the PIN associated with the card. Where such is the situation, the banks do not want the transaction data signal to be delivered simultaneously to a printer and the TIM but prefer to send the coded transaction data signal directly to the central bank where this signal is decoded and the transaction data signal information is stored, processed and then returned to the TIM where the alphanumeric transaction signal absent the card number code and PIN data is available for further use.

Attention is now directed to FIG. 2 which provides an automatic transaction surveillance system that meets the needs of banks that seek the added confidence of maintaining complete security over an individuals card number and PIN.

In the description that follows of FIG. 2 wherever components are employed that match those described in reference to FIG. 1, corresponding reference numerals will be employed The automatic transaction surveillance system of FIG. 2 distinguishes itself from that which was described earlier by not delivering the alphanumeric transaction data signal on lead 46 to the CRT display 16, the printer 47 and the TIM 51 but rather, the transaction signal on lead 46 is delivered directly to the main computer 106 at the remote central bank 105. The main computer decodes the alphanumeric transaction data signal in a wholly conventional manner and then returns an encoded alphanumeric data transaction signal back over lead 49, 49a to the printer 47 and the TIM via leads 49, 49b. The arrangement completely avoids any concern that the sensitive card identity number and PIN could be obtained by a party some how gaining access to an input terminal of the printer 47.

It should be understood that the systems depicted in FIGS. 1 and 2 are showings of various embodiments of the invention in their simplest form. In each figure it should be made clear that the transaction data entry means 21 and the central bank computer 106 may be interconnected in a myriad or ways to provide more or less data manipulation at either the ATM or at the central bank 105. The nature of these arrangements are not necessary for the understanding and practice of the invention. In fact, there are a number of different manufactures of ATM's which employ a variety of computer technologies such as, but not limited to such approaches referred to as DIEBOLD, IBM, etc.

Figure 3:
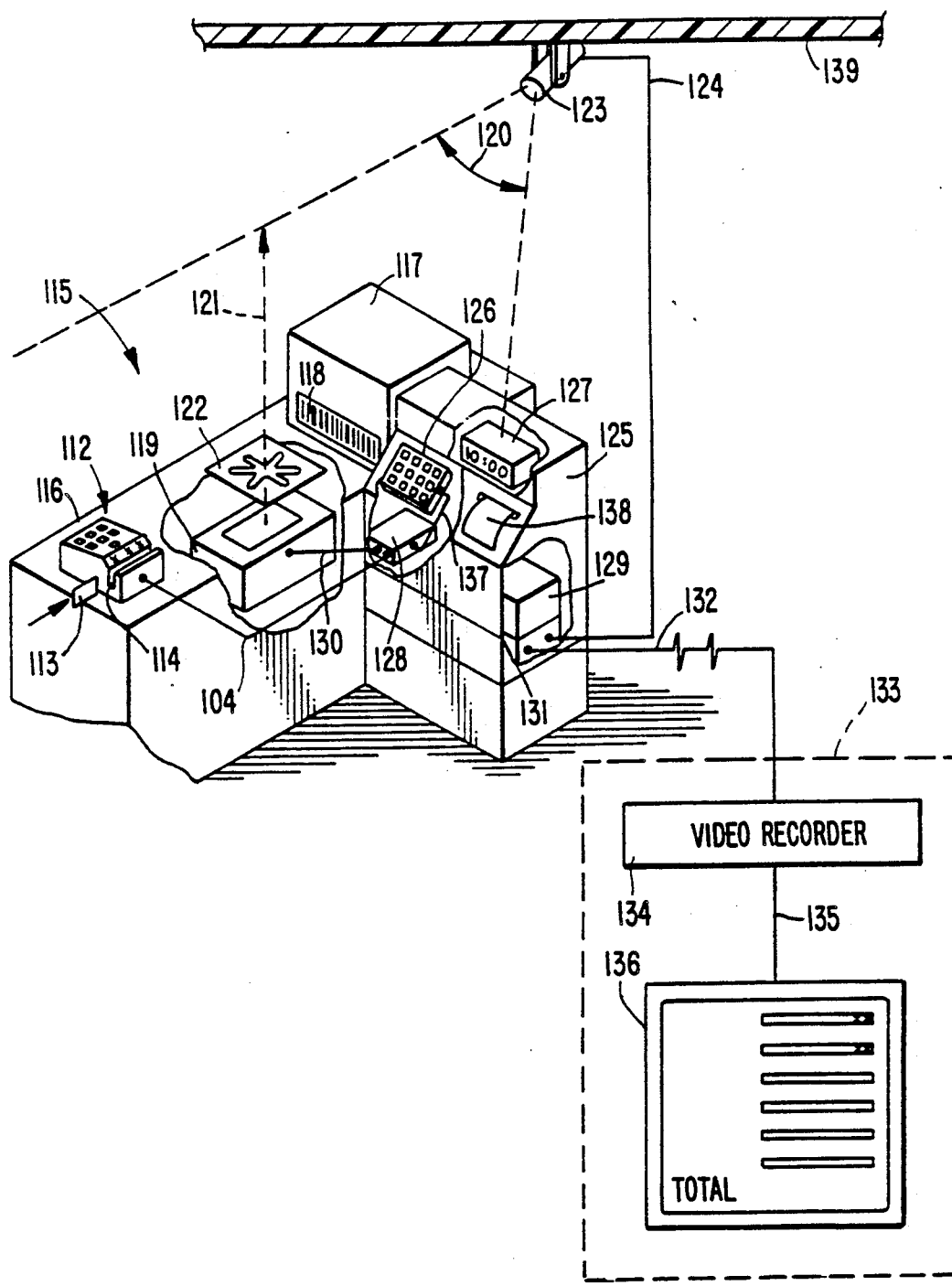
FIG. 3 illustrates in three dimensional form the automatic surveillance system of the invention in a retail point-of-sale environment.

Turning now to the last embodiment of the invention as shown in FIG. 3, which looks to providing automatic financial transaction surveillance where the transaction is in a check-out counter environment 115 which involves point-of-sale entry of quantity and pricing information in an electronic cash register 125. A check out counter 116 conventional in nature is shown with an item to be purchased 117 shown resting on the counter. A bar coded label with product identification information is shown secured to the item 117. Beneath the counter 16 as viewed through a partial section in the counter is a laser beam label reading unit 119 that projects continuously scanning laser beam 121 which passes through a slotted aperture plate 122 as shown. In practice, the item 117 is turned on its side with the label 118 down and the item is drawn by a clerk, not shown, over the slotted aperture plate 122 where the laser beam strikes the bar coded label and returns a reflected beam interrupted in response to the nature of the combination of the bar code widths which allows the laser beam label reading unit to provide a signal on lead 130 to a data entry logic module 128 in the cash register 125. The cash register includes conventional state-of-the art microprocessor controlled memory which allows for the generation of an alphanumeric signal that includes the items identify and price. The nature of the circuitry that accomplishes the generation of an alphanumeric signal with product and price data therein is not part of the invention and will not be described further.

The cash register 125 also includes a transaction data entry key and 126 which functions in much the same fashion as the keypad 22 in FIG. 1. The clerk (not shown) can and does independently enter product identification and pricing data by means of the data entry keypad 126. This results in an alphanumeric transaction data signal being delivered via lead 137 to the transaction data entry logic module 128 which in turn by means of a lead not shown, delivers the signal to a transaction information module (TIM) 131 and a printer 129 that provides a receipt 138.

A video camera 123 is shown secured to a ceiling 139. The camera 123 is positioned such that its image field, as indicated reference numeral 120 and associated arrows, takes in both the customer (not shown) and the clerk (not shown) entering the transaction data. It is important to note that the video camera need not be positioned in a way that will place within its field of view the alphanumeric character display 127 as the surveillance system of the invention does not have to provide a readable image of the characters in the display The TIM 131 provides a combined video image and a transaction data signal to a remote monitoring station 133 that includes a video recorder 134 coupled via lead 135 to a video monitor 136 which allows a visual monitoring at a later time of all transactions. It should be noted that check-out systems of the nature just described have become commonplace. The receipts 138 that electronic cash registers 125 of this type provide include most generally thereon a full written description of the product purchased and the price paid. The video recorder captures all of the product and price data and presents the same in an easy to read form on the face of the video monitor where a visual check can be made to see if all the terms passing through the check out station have been properly included in the total charged by the clerk.

Also shown on the checkout counter 116 is a bank card read/PIN information data entry module 112 which accommodates a bank card 113 which can be passed through a slot 114 to be read in a conventional manner. The module 112 includes data entry keys, shown but not referenced. It is to be understood that the module 112 would include a numeric display, key pad and ENTER//DO NOT ENTER buttons of the nature shown in FIG. 1 and identified as 16, 22, 26 and 27. An electrical lead 104 delivers bank card data and PIN information to the data entry logic module 128. It should be further noted that, while not shown in the drawing, there would be required an electronic link between the cash register 125 and a central bank. This arrangement just described would allow a retail customer to change the cost of items purchased directly against funds in his account. This arrangement permits a cash free/checkless retail transaction to occur with complete security. The surveillance system in the point-of-sale environment of the invention may be employed without the bank card read/PIN information data entry module 112.

Figure 4:
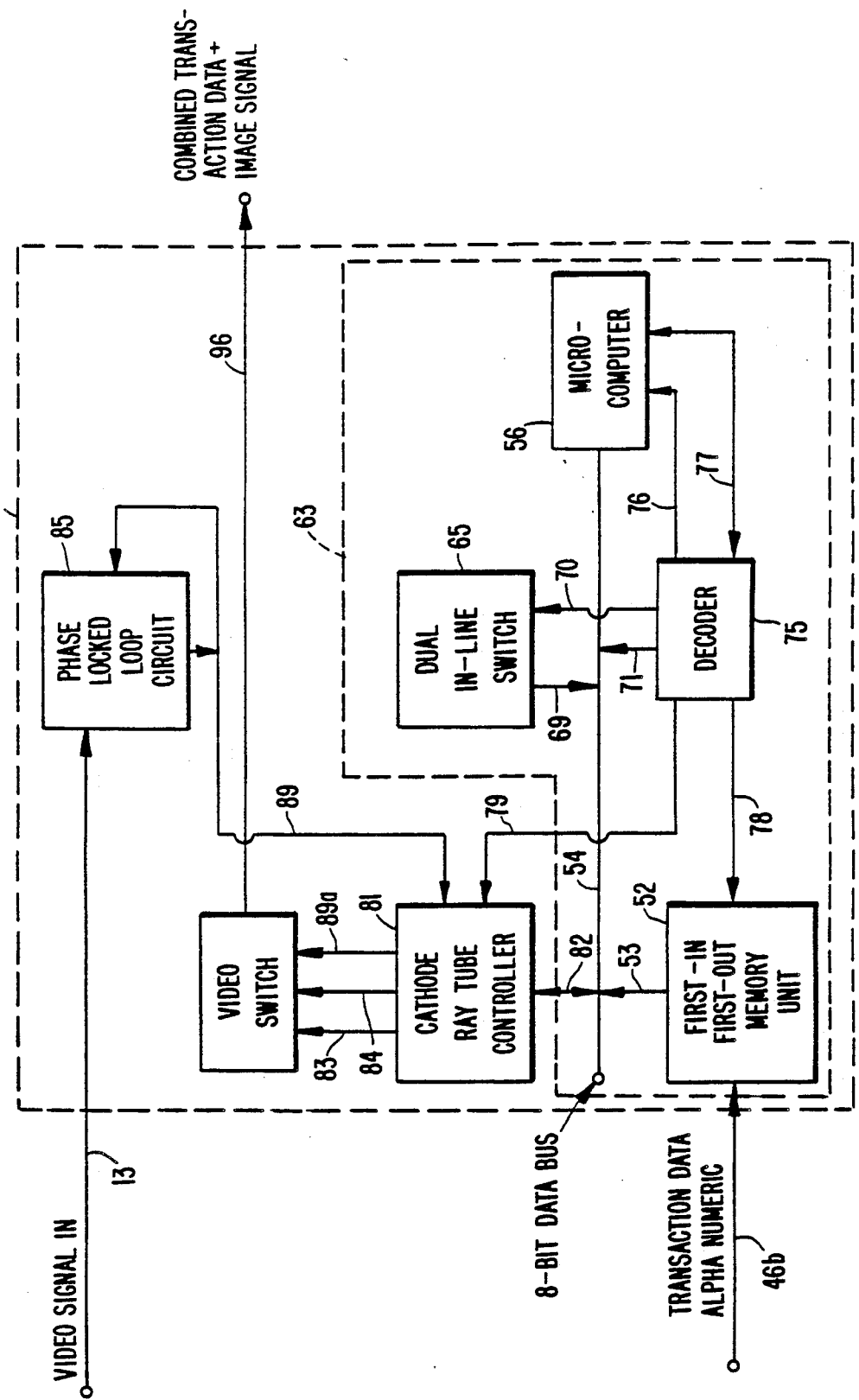
FIG. 4 depicts in block diagram form the functional details of a transaction information module containing the invention.

Attention is now directed to FIG. 4 which illustrates in block diagram form, the transaction information module (TIM) 51 which corresponds to the TIM 51 of FIG. 1, 2 and TIM 131 of FIG. 3.

When FIG. 4 is studied in conjunction with FIG. 1, it will be apparent that the TIM 51 receives from the video camera 12 a video camera image signal on video camera output lead 13. The video camera image signal is processed by a phase locked loop circuit 85 which delivers its output on a lead 89 to a cathode ray tube controller 81. The operation and construction of the phase-locked loop circuit 89 is conventional. The phase-locked loop operates to produce an oscillator frequency to match the frequency the video camera image signal. Accordingly, any slight change in the frequency of video camera image signal first appears as a change in phase between the video camera image signal and the oscillator (not shown). The phase shift then acts as an error signal to change the frequency of the oscillator to match the frequency of the video camera image signal. More will be said about the purpose of phase locked loop circuit 85 in a discussion of FIG. 10 to be found hereinafter.

The TIM 51, FIG. 4 also receives on lead 46b an alphanumeric transaction data signal from the transaction data entry means 21, see FIG. 1. In FIG. 4, it will be observed that the alphanumeric transaction data signal on lead 46b is delivered to a first-in, first-out circuit 52 which has an output lead 53 connected to a data bus 54, which data bus 54 is simultaneously coupled to a microcomputer 56, a decoder 75 and a dual in-line switch 65 via leads 9 and 71 respectively.

Figure 5:
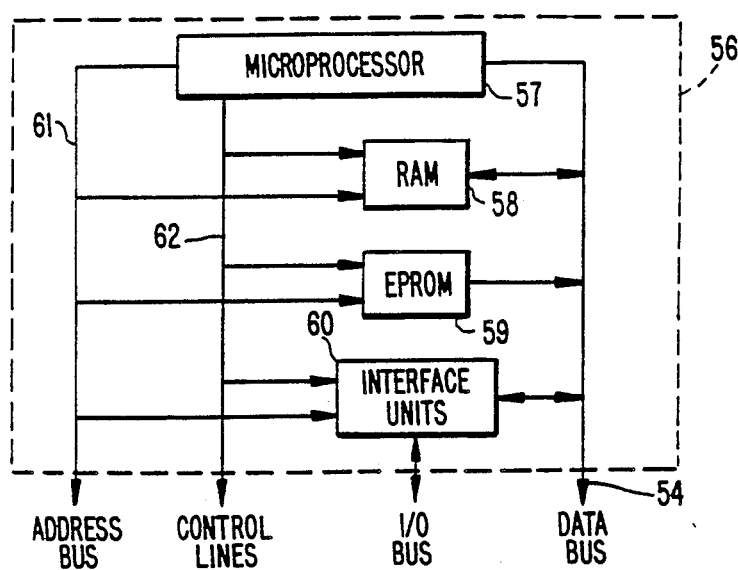
FIG. 5 is a block diagram of microcomputer which forms a part of a transaction information module of the invention.

Attention will now be directed to the microcomputer 56 of FIG. 4 and the more detailed showing of the same in FIG. 5. The microcomputer 56 is a complete computer system, conventional in nature and consists of a central processing unit, i.e., microprocessor 57, a memory made up of random access memory (FRM) 58 and an erasable programmable read-only memory (EPROM) 59, as well as interface units 60 which communicate with input-output devices through an inputoutput I/O bus all as shown in FIG. 5 At any given time, the microprocessor 57 selects one of the interface units 60 through an address bus 61. Transaction data is transferred to and from the selected unit and the microprocessor 57 via the data bus 54. Control information is transferred through individual control lines 62, each line specifying a particular control function The RAM 58 is a read/write memory type and consists of a number of IC packages connected together It is used to store data, variable parameters, and intermediate results that need updating and are subject to change The EPROM 59 consists of a number of IC packages and is used for storing programs and tables of constants that are not subject to change once the production of the microcomputer system is completed.

The interface units 60 provide the necessary paths for transferring information between the microprocessor and external input and output devices connected to the I/O bus. The microprocessor 57 receives status and data information from external devices through the interface. It responds by sending control and data information for the external devices through the interface 60. This communication is specified by programmed instructions that direct through the buses in the microcomputer system.

The communication between the components in a microcomputer takes place via the address bus 61 and data bus 54. The address bus 61 is unidirectional from the microprocessor to the other units. The binary information that the microprocessor places on the address bus 61 specifies a particular memory word in RAM or EPROM. The address bus 61 is also used to select one of many interface units connected to the system or to a particular register within an interface unit 61. The number of lines available in the address bus determined the maximum memory size that can be accommodated in the system. The data bus transfers data to and from the microprocessor and the memory or interface which is selected by the address bus. The data bus is bidirectional, which means that the binary information can flow in either direction.

It will be recalled that the alphanumeric transaction data signal an lead 46b is received by the first-in, first-out memory unit 52. The first-in, first-out memory unit 52 is a first-in, first-out dual port memory which is sourcing and absorbing data at different rates. First-in, first-out unit 52 receives the alphanumeric transaction data information which is converted to character code (Faster speed, low byte) and hammer code (Slower speed, high byte) and sends them to the microprocessor 57 of microcomputer 56 via lead 53 and data bus 54. The transaction data is loaded and emptied on a first-in-, first-out basis to avoid overlap data.

Figure 6:
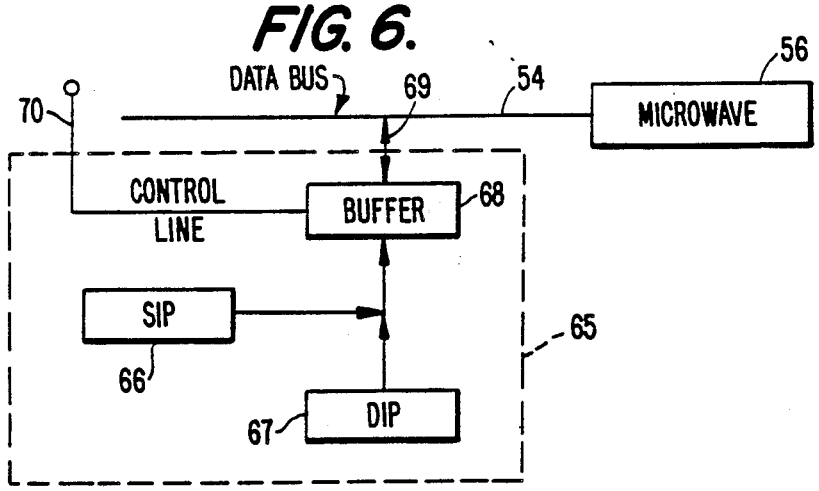
FIG. 6 is a block diagram of a dual in-line switch arrangement which forms a part of a transaction information module of the invention.

Centrally disposed in FIG. 4 is shown a dual in-line package (DIP) switch 65 The DIP switch unit 65 is shown in more detail in FIG. 6 and includes a single-in-line package (SIP) 66, a dual-in-line package (DIP) 67 and buffer 68 connected as shown. The switch arrangement allows digital status to be sent to the microcomputer 56 through the buffer 68. The output 69 of the buffer 68 is controlled by a control line 70 from a decoder 75 that controls microcomputer memory, i.e., RAM 58, EPROM 59 and the I/O interface units 60.

Figure 7:
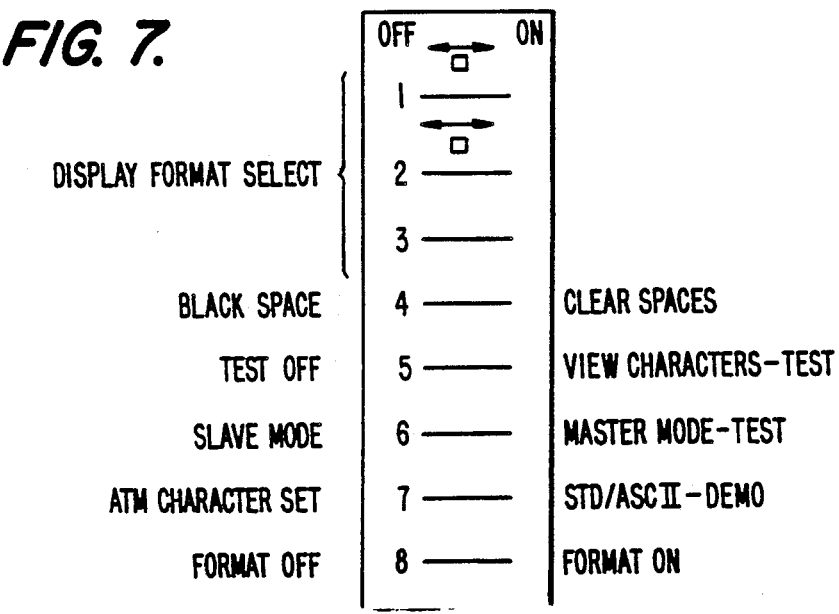
FIG. 7 is a showing of the various functions of the dual in-line switch of FIG. 6.

The TIM 51 has four selectable display formats available at any time, one when each of the first three switches (SIP 66, DIP 67) is selected and a default if none is selected DIP switch 65 is used to select these display format and its function is illustrated in FIG. 7.

Figure 8:
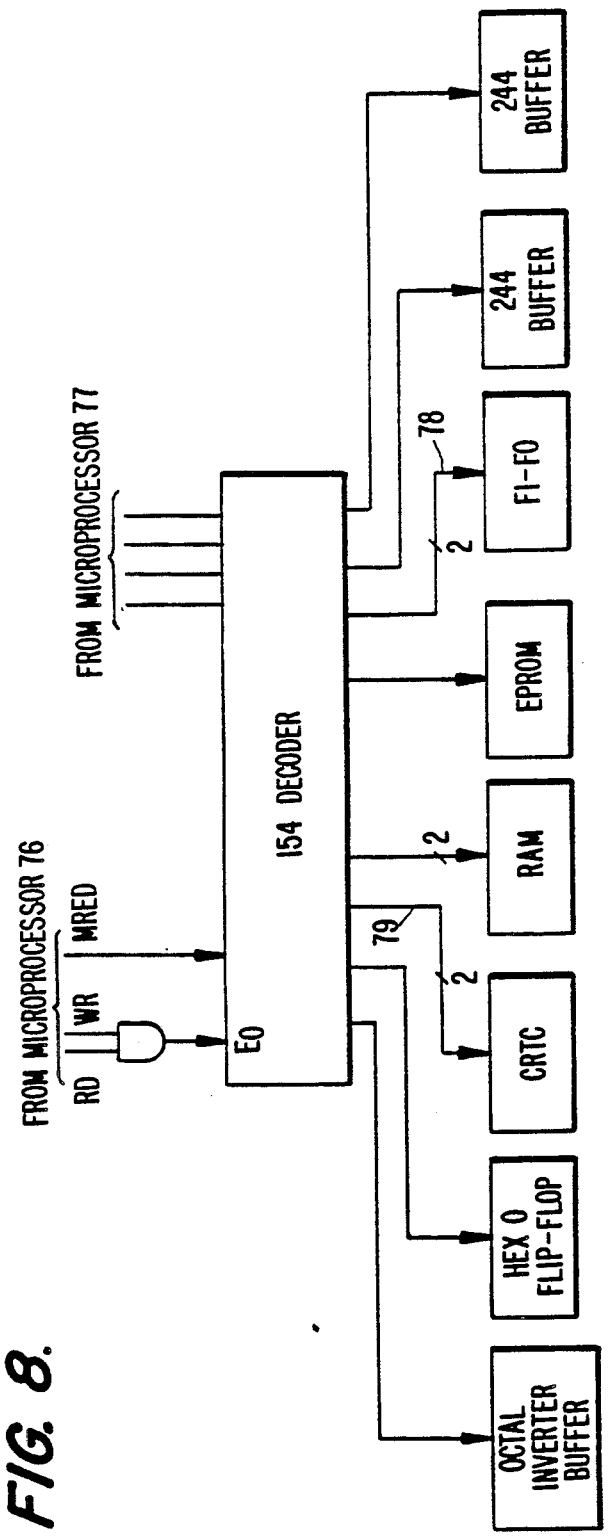
FIG. 8 is a block diagram of a decoder which forms a part of a transaction information module of the invention.

Attention is now directed to FIG. 8 which illustrates in greater detail, the decoder 75 which is designed to accept 4-bits of binary data and provide 1 of 16 mutually exclusive active low outputs. The fact that only one output can be equal to 0 at any one time is used to control the operation of the microcomputer 56 and input-/output interface units 60 so that only one device can drive the 8-bit data bus at any one time. A "truth Table" as shown in FIG. 9 and a logic diagram of FIG. 10 provide an indication of the nature of decoder function As was indicated earlier, the phase locked loop circuit 35 operates to produce a signal that matches the frequency of the video camera image signal. This phase locked signal is delivered to the cathode ray tube (CRT) controller 81 via lead 89 to maintain the operating frequency of cathode ray tube controller 81.

Figure 11:
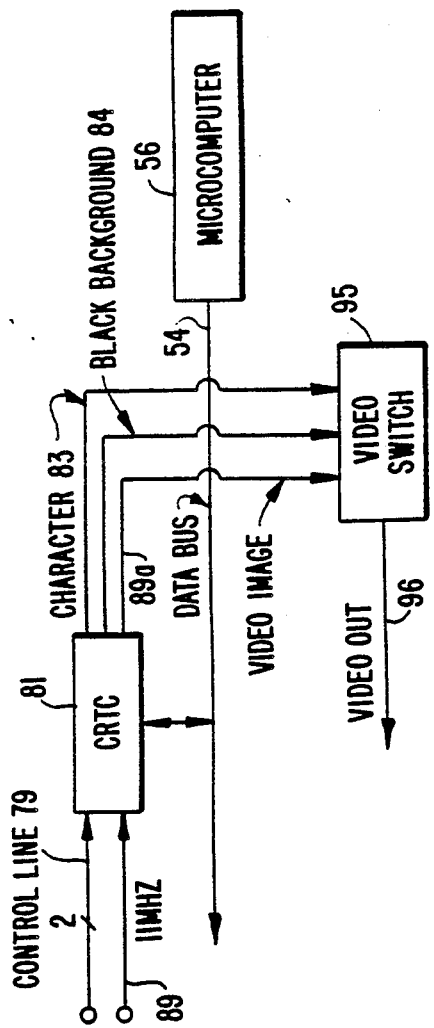
FIG. 11 is a block diagram of the functional relationship of a cathode ray tube controller which cooperates with other elements of a transaction information module embodying the invention.

The CRT controller 81 is used as the interface function to format the data from the microcomputer 56 so that it will eventually appear as alphanumeric characters on a video screen monitor in a preselected location on the screen. FIG. 11 illustrates the cooperative functional relationship of the cathode ray tube controller (CRTC) 81, the microcomputer 56; the data bus and finally video switch 95 which provides on lead 96, the combined transaction data and video image signal. The video switch 95 is a device that receives on lead 89a , the video image signal as well as the alphanumeric character signal on lead 83 and a black back ground signal on lead 84. The video switch is therefore the final means for combining the video image and alphanumeric transaction data signals prior to recording in the video recorder 101 or on monitor 110 (see FIG. 1).

Attention is now again directed to FIG. 4 and more particularly the broken line outline of what is termed an alphanumeric video display control means 63. The alphanumeric video display control means includes the first-in, first-out memory unit 52, microcomputer 56 dual in-line switch 65 and decoder 75 which cooperate in the manner heretofore described.

By way of summary , it will be appreciated that the alphanumeric video display control means 63 receives the transaction information data signal on lead 46b and delivers to the cathode ray tube controller 81 on lead 79 a signal representative of an alphanumeric representation of the transaction data, as well as, a location in the video image of the alphanumeric representation of the transaction data.

From the foregoing, it is readily apparent that the invention described provides a unique surveillance system for automatic teller machines and point-of-sale retail transactions because the system embodying the invention creates a video tape record that furnishes the identity of individuals involved in a transaction as well as easily readable alphanumeric characters which define the exact nature of the transaction under surveillance.

In view of the above description, it should be abundantly clear that the system and apparatus provides a distinct improvement over the state of the art.

Although only three embodiments of the invention have been illustrated and described, it will be apparent to those skilled in the art that various changes and modifications may be made to these embodiments without departing from the spirit and scope of the invention as defined in the appended claims.

I claim:

1. An automatic teller machine transaction surveillance system comprising:

a camera positioned to receive an image of an individual involved in a financial transaction with an automatic teller machine that can be manually manipulated by said individual to enter financial transaction data in said automatic teller machine, said camera providing a signal representative of said image, said automatic teller machine including a transaction information data entry means and a transaction information means, said transaction data entry means providing a transaction data signal to a display means and a coded transaction data signal directly to a physically remote data processing, storage and sending means at a central bank, said transaction data entry means including a manually operated key pad electrically coupled to a data entry logic means, said key pad manipulateable to enter a personal identification number of said individual as well as financial transaction data, said data entry means providing said financial transaction data signal to said display means, while simultaneously providing said coded transaction data signal to said central bank data processing, storage and sending means, said coded transaction data signal including said personal identification number.

said transaction data entry means further including a credit card reading means electrically coupled to said data entry logic means, said credit card reading means providing individual credit card identification data which forms a portion of said financial transaction data, said coded transaction data signal further including said credit card identification data, signal further including said credit card identification data, a transaction receipt printer, said transaction information means electically coupled to said camera, said data processing, storage and sending means receiving a nd decoding said coded transaction data signal, said data processing storage and sending means providing a financial transaction data signal absent said credit card and personal identification number data to said transaction receipt printer and said transaction information means, said transaction information means receiving said camera inmage signal froms said camera and said financial transaction data signal via said data processing, storage and sending means, said transaction information means combining said camera image signal and said financial transaction data signal to thereby provide a combined camera image and transaction signal, recording means electrically coupled to receive and record from said transaction information means said combined camera image and financial transaction data signal for later visual monitoring.

2. The automatic transaction surveillance system of claim 1, wherein said camera is a video camera which provides a video image signal.

3. The automatic transaction surveillance system of claim 1, wherein said combined video camera image and transaction data signal is electrically coupled to said remote data processing, storage and sending means that includes a backup recording means to allow the visual monitoring of the individual involved in a transaction and the details of the transaction provided by said combined video camera image and financial transaction data signal.

4. The automatic transaction surveillance systems of claim 3, wherein said recording means and said backup recording means are controlled by said remote data processing, storage and recording means.

* * * * *